US007629571B2

(12) United States Patent  
Plank et al.

(10) Patent No.: US 7,629,571 B2
(45) Date of Patent: Dec. 8, 2009

(54) LIGHT MEASUREMENT APPARATUS

(75) Inventors: Wolfgang Plank, Rankweil (AT); Bruno Senn, Buchs (CH)

(73) Assignee: Ivoclar Vivadent AG, Schaan (LI)

( * ) Notice: Subject to any disclaimer, the term of this patent is extended or adjusted under 35 U.S.C. 154(b) by 216 days.

(21) Appl. No.: 11/824,257

(22) Filed: Jun. 29, 2007

(65) Prior Publication Data

US 2008/0023625 A1    Jan. 31, 2008

Related U.S. Application Data

(60) Provisional application No. 60/880,764, filed on Jan. 17, 2007.

(30) Foreign Application Priority Data

Jul. 31, 2006    (DE) .................. 10 2006 035 657

(51) Int. Cl.
G01J 1/04 (2006.01)
G01N 21/00 (2006.01)
A61C 3/00 (2006.01)

(52) U.S. Cl. .................. 250/227.11; 356/218; 433/33
(58) Field of Classification Search ........... 250/227.11, 250/227.33, 208.2; 356/218, 222; 433/33
See application file for complete search history.

(56) References Cited

U.S. PATENT DOCUMENTS

| 5,115,126 | A |   | 5/1992  | Ams et al.       |         |
|-----------|---|---|---------|------------------|---------|
| 5,147,204 | A |   | 9/1992  | Patten et al.    |         |
| 5,471,129 | A |   | 11/1995 | Mann             |         |
| 5,521,392 | A |   | 5/1996  | Kennedy et al.   |         |
| 5,759,030 | A | * | 6/1998  | Jung et al.      | 433/29  |
| 5,880,826 | A | * | 3/1999  | Jung et al.      | 356/73  |
| 6,103,203 | A |   | 8/2000  | Fischer          |         |
| 6,118,521 | A | * | 9/2000  | Jung et al.      | 356/73  |
| 6,188,471 | B1 | * | 2/2001  | Jung et al.     | 356/73  |
| 6,206,691 | B1 | * | 3/2001  | Lehmann et al.  | 433/26  |
| 6,239,868 | B1 | * | 5/2001  | Jung et al.     | 356/73  |
| 6,519,037 | B2 | * | 2/2003  | Jung et al.     | 356/419 |
| 6,538,726 | B2 | * | 3/2003  | DeJung et al.   | 356/73  |
| 6,602,074 | B1 |   | 8/2003  | Suh et al.       |         |
| 6,870,616 | B2 | * | 3/2005  | Jung et al.     | 356/326 |
| 6,958,810 | B2 | * | 10/2005 | Jung et al.     | 356/73  |
| 7,018,204 | B2 | * | 3/2006  | Jung et al.     | 433/26  |
| 7,069,186 | B2 | * | 6/2006  | Jung et al.     | 702/188 |
| 7,139,068 | B2 | * | 11/2006 | Jung et al.     | 356/73  |
| 7,192,276 | B2 | * | 3/2007  | Fischer et al.  | 433/29  |

(Continued)

FOREIGN PATENT DOCUMENTS

CA    2263269    11/1999

(Continued)

*Primary Examiner*—John R Lee
(74) *Attorney, Agent, or Firm*—John C. Thompson; Alan S. Korman

(57) ABSTRACT

The invention relates to a light measurement apparatus (34), having a light source to which a light guide apparatus (24) is connected, with the light guide apparatus (24) having a light outlet area (30) on the light output side and the light measurement apparatus (34) having a light sensor arrangement (36), and having a stop for the light guide apparatus (24) to make contact with. The light sensor arrangement (36) has at least two sensors (40a, 40b, 40c, ...), to which light from the light outlet area (30) can be applied.

17 Claims, 2 Drawing Sheets

U.S. PATENT DOCUMENTS

| | | | |
|---|---|---|---|
| 7,195,482 B2 * | 3/2007 | Scott | 433/29 |
| 7,240,839 B2 * | 7/2007 | Jung et al. | 235/454 |
| 7,244,122 B2 * | 7/2007 | Jung et al. | 433/26 |
| 7,245,371 B2 * | 7/2007 | Wang et al. | 356/301 |
| 7,397,562 B2 * | 7/2008 | Jung et al. | 356/419 |
| 7,403,285 B2 * | 7/2008 | Jung et al. | 356/326 |
| 2001/0023058 A1 * | 9/2001 | Jung et al. | 433/29 |
| 2001/0029009 A1 * | 10/2001 | Jung et al. | 433/29 |
| 2001/0038451 A1 * | 11/2001 | Jung et al. | 356/328 |
| 2001/0038453 A1 * | 11/2001 | Jung et al. | 356/419 |
| 2001/0043330 A1 * | 11/2001 | Jung et al. | 356/419 |
| 2001/0049083 A1 * | 12/2001 | Jung et al. | 433/29 |
| 2002/0097400 A1 * | 7/2002 | Jung et al. | 356/419 |
| 2002/0180953 A1 * | 12/2002 | De Jung et al. | 356/73 |
| 2003/0011768 A1 * | 1/2003 | Jung et al. | 356/326 |
| 2003/0197855 A1 * | 10/2003 | Jung et al. | 356/73 |
| 2003/0207228 A1 * | 11/2003 | Lehmann et al. | 433/26 |
| 2004/0043350 A1 * | 3/2004 | Jung et al. | 433/29 |
| 2005/0168742 A1 | 8/2005 | Jung et al. | |
| 2006/0028639 A1 | 2/2006 | Scott et al. | |
| 2006/0044555 A1 * | 3/2006 | Wang et al. | 356/301 |
| 2006/0050264 A1 * | 3/2006 | Jung et al. | 356/73 |
| 2007/0026363 A1 * | 2/2007 | Lehmann et al. | 433/223 |
| 2008/0023625 A1 * | 1/2008 | Plank et al. | 250/227.11 |

FOREIGN PATENT DOCUMENTS

| | | |
|---|---|---|
| DE | 90 05 042.8 | 11/1990 |
| DE | 92 12 892.0 | 1/1993 |
| EP | 1 094 308 | 4/2001 |

* cited by examiner

LIGHT MEASUREMENT APPARATUS

CROSS-REFERENCE TO RELATED APPLICATIONS

This application claims foreign priority benefits under 35 U.S.C. §119(a)-(d) from German patent application ser. no. 10 2006 035 657.8 filed Jul. 31, 2006. In addition, this application claims the benefit under 35 U.S.C. §119(e) of U.S. provisional patent application Ser. No. 60/880,764 filed Jan. 17, 2007.

TECHNICAL FIELD

The invention relates to a light measurement apparatus for a light source to which a light guide apparatus is connected, with the light guide apparatus having a light outlet area on the light output side, and more particularly to a light measurement apparatus having light sensor arrangements wherein the light sensor arrangement has at least two sensors to which light from the light outlet area can be applied.

BACKGROUND OF THE INVENTION

A light measurement apparatus, by means of which the combination of a light source and a light guide apparatus such as an optical cable is measured, is known, for example, from U.S. Pat. No. 5,115,126. In the case of this test device for endoscope equipment, the light which is emitted from a light source is supplied to a light sensor arrangement having two sensors, partially directly and partially indirectly, that is to say via the light guide apparatus. The detection results of the two sensors are related to one another and are evaluated in order to make it possible to ensure correct operation of the endoscope there.

Numerous versions of light measurement apparatuses have become known. By way of example, U.S. Pat. No. 5,471,129 has already disclosed a calibration apparatus for the light curing appliance there, which is intended to prevent only partial curing of the dental restoration product to be polymerized as a result of an inadequate amount of light being emitted. CA 2 263 269 discloses the calibration of a light curing appliance, in which the electrical parameters of the light source are used for calibration.

Finally, U.S. Pat. No. 5,147,204 discloses a light power detector being fitted to a light curing appliance, and being connected to an evaluation circuit. In this solution, a signal is emitted only when the light power is greater than a predetermined threshold value.

Furthermore, it has already been proposed for a sensor to be provided which has a smaller diameter than the light guide apparatus and its light outlet area. The aim of this is to allow light to be measured without any difference for all possible diameters of light guide apparatuses. This has the disadvantage that, in the case of an optical waveguide with a relatively large light diameter, only a relatively small percentage of the emitted light power is detected. This solution is therefore suitable only for light curing appliances whose diameter is essentially the same as that of the optical waveguide.

OBJECTS AND SUMMARY OF THE INVENTION

In contrast, the invention is based on the object of providing a light measurement apparatus which can be used more universally and, in particular, makes it possible to reliably determine whether the actually emitted light power is or is not sufficient.

The invention provides for the light sensor arrangement according to the invention to be designed in a particular manner. It has two sensors to which light from the light outlet area can be applied. The light outlet area is formed at the front end of the light guide apparatus, so that the light emitted there corresponds to the light power of the light sources which are connected to the light guide apparatus.

According to the invention, the light power which is available for light curing is to this extent measured, to be precise according to the invention irrespective of whether a light guide apparatus having a large cross section or a light guide apparatus having a small cross section is used.

The use of a plurality of sensors which, however, can also be reduced to only two sensors in an individual case makes it possible to ensure that the number of sensors to which light is applied is correlated with the diameter of the light guide apparatus. A threshold value for sensors to which light is applied and to which light is not applied is preferably predetermined for this purpose and can be predetermined, for example, by half the calculated light strength of the maximum measured light strength.

If the measured light strength is less than the threshold value, it is assumed that the diameter of the light outlet area is sufficiently small that it is not covering the relevant light sensor.

By way of example, 8, 16, 64 or even 256 light sensors may be arranged alongside one another. If the light outlet area is circular, the diameter and thus the effective area of the light guide apparatus can be determined from the number of illuminated sensors in comparison to the total number. As is known, the area A is:

$$A = O/4 * D^2$$

where D is the diameter.

The diameter which is to this extent measured according to the invention is that between the respectively outermost sensors to which light is still applied, or possibly—when using a stop—the distance between the first sensor and the last sensor to which light is still applied.

In this case, the expression a light guide apparatus means any desired suitable light guide apparatus of a light curing appliance. This includes light guide rods with optical waveguides arranged in the appliance, or else light guide apparatuses for light sources which are arranged at the tip of a guide rod of a light curing appliance, in this context including, for example, convergent lenses, reflectors and covers. The light guide apparatuses have the common feature that the light leaves an optical effective body and enters the surrounding air at a specific point which is at a distance from the actual light source—even if this is only fractions of millimeters.

According to the invention, it is particularly advantageous that all of the light power which is available for light curing can be determined by combined measurement of both the diameter and the respectively emitted light strength.

Thus, according to the invention, account is also taken of different distributions of the light powers, depending on the optics being used. For example, the light power may be particularly strong at the outer circumference of the optical waveguide, so that the light strength at the front and rear end of the light outlet area is particularly high. If a point measurement is now carried out at any desired point, it may not be possible to detect the light power at the appropriate level. The wedge-shaped sensor arrangement makes it possible to detect and determine the total power, or else deliberately to detect the distribution of the light power.

According to the invention, it is also particularly advantageous that the light power per cm² can be determined automatically, because both the emitted total power and the area can be determined by the light measurement apparatus according to the invention. This value is critical to the curing of a dental restoration. part that is to be polymerized.

It is thus possible without any problems according to the invention to compensate for the specific light power, which decreases as the diameter of the light guide apparatus or of the light guide rod increases. In this context, the specific light power shall be understood to be the light power per unit area.

Instead of using a stop, it is also possible to use an electronic stop. The strip of light sensors is in any case longer than the maximum possible diameter of the light outlet area which is intended to be measured. If the light outlet area is now held with its maximum diameter on the light sensor arrangement, it is possible to determine the diameter of the light outlet area. However, if the light outlet area is circular, a slight discrepancy, for example even a slightly inclined position, can lead to measurement errors.

In order to prevent this, one advantageous refinement provides for the light outlet area to be guided transversely over the strip of sensors, that is to say the light sensor arrangement, for the maximum extent of the illuminated area to be detected electronically, and thus for the diameter of the light outlet area to be determined.

Although circular light outlet areas are primarily intended to be tested for this purpose, it is self-evident that square light outlet areas or light outlet areas with any other desired shapes can also be tested, in which case appropriate adjustment is expediently provided for the light measurement apparatus for this purpose.

When the light outlet area is guided over the light sensor arrangement as explained above, it is, however, also possible to carry out controlled detection of the shape, and this can then be taken into account as appropriate in the evaluation circuit.

One particularly advantageous refinement of the invention provides for the sensor arrangement to be in the form of a pronounced narrow row. This makes it possible to carry out a narrow-strip measurement even when the light guide apparatus diameters are quite small, that is to say in particular to prevent edge blurring owing to the curvature of the optical waveguide at the edges.

In this context, one advantageous refinement provides for the light guide apparatus to make contact with a centering aid as a stop. This ensures that the maximum diameter is detected, rather than any other secant instead of this.

According to the invention, it is particularly advantageous for the light sensor arrangement to have a mask in the form of a slot which in fact considerably reduces the effective width of the sensors. This makes it possible to further reduce measurement errors, and prevent the measurement result from being corrupted by light incidence from the side.

A further advantageous refinement provides for the individual sensors to be separated from one another by narrow, opaque webs so that no light can cross over between two mutually adjacent sensors.

A further advantageous refinement of the invention provides for a prefabricated light sensor arrangement, in particular with a transparent cover, to be installed in the light measurement apparatus.

A further advantageous refinement of the invention provides for the light measurement apparatus to have a stop for the light guide apparatus to make contact with.

A further advantageous refinement of the invention provides for the light sensor arrangement to have light sensors which are arranged in a row, and for the longitudinal extent of the row to be greater than the diameter of the largest light outlet area that occurs.

A further advantageous refinement of the invention provides for the light outlet area to cover at least one light sensor when the light guide apparatus is making free contact with the stop.

A further advantageous refinement of the invention provides for the light outlet area to be essentially circular and for the light sensors to have a width which is less than the smallest light outlet area that occurs, and in particular to be arranged immediately adjacent to one another.

A further advantageous refinement of the invention provides for the light sensor arrangement to be an arrangement of light sensors in the form of a strip, in particular of between three and five hundred light sensors.

A further advantageous refinement of the invention provides for each light sensor to have an aspect ratio (width/length ratio) of at least 2:1 and at most 20:1, preferably of about 5:1.

A further advantageous refinement of the invention provides for the light sensor arrangement to have a length of more than 10-times the diameter of the light outlet area.

A further advantageous refinement of the invention provides for the cover to be covered by a translucent or transparent filter which essentially compensates for the spectral sensitivity of the sensors in the light sensor arrangement.

According to a further advantageous refinement of the invention provides for a protective shutter to be installed on a filter or the cover, which leaves free an area in the form of a slot above the light sensor arrangement, and covers areas to the side of this area.

A further advantageous refinement of the invention provides for the light outlet area to be useable for different light guide apparatuses and for one light guide apparatus with a relatively large light outlet area to cover a greater number of sensors.

A further advantageous refinement of the invention provides for a discriminator to be connected to one light sensor and to emit an ON signal when the detected amount of light is above a predetermined threshold value, and to emit an OFF signal when the amount of light is below the threshold value.

A further advantageous refinement of the invention provides for an evaluation circuit to be connected to the light sensor arrangement and to form the ratio of the amount of light detected by the light sensors to the number of light sensors which receive light and are adjacent to one another.

A further advantageous refinement of the invention provides for the light power which is emitted from the light outlet area to be calculated on the basis of the ratio of the amount of light measured over their area by the light sensors and the total light outlet area.

A further advantageous refinement of the invention provides for the light sensor arrangement to measure not only the amount of light emitted per unit area from the light outlet area but also the diameter of the light outlet area.

A further advantageous refinement of the invention provides for the light sensor arrangement to be in the form of a single-line or multiple-line bar, at one of whose ends the stop for the light guide apparatus is arranged.

A further advantageous refinement of the invention provides for the number of sensors illuminated by the light guide apparatus to be determined by an evaluation circuit, and the average amount of light applied to the sensors to be calculated in order to calculate the light power per unit area of a light source.

BRIEF DESCRIPTION OF THE FIGURES

Further advantages, details and features will become evident from the following description of one exemplary embodiment, on the basis of an example.

In the figures.

DETAILED DESCRIPTION

Figure 1:
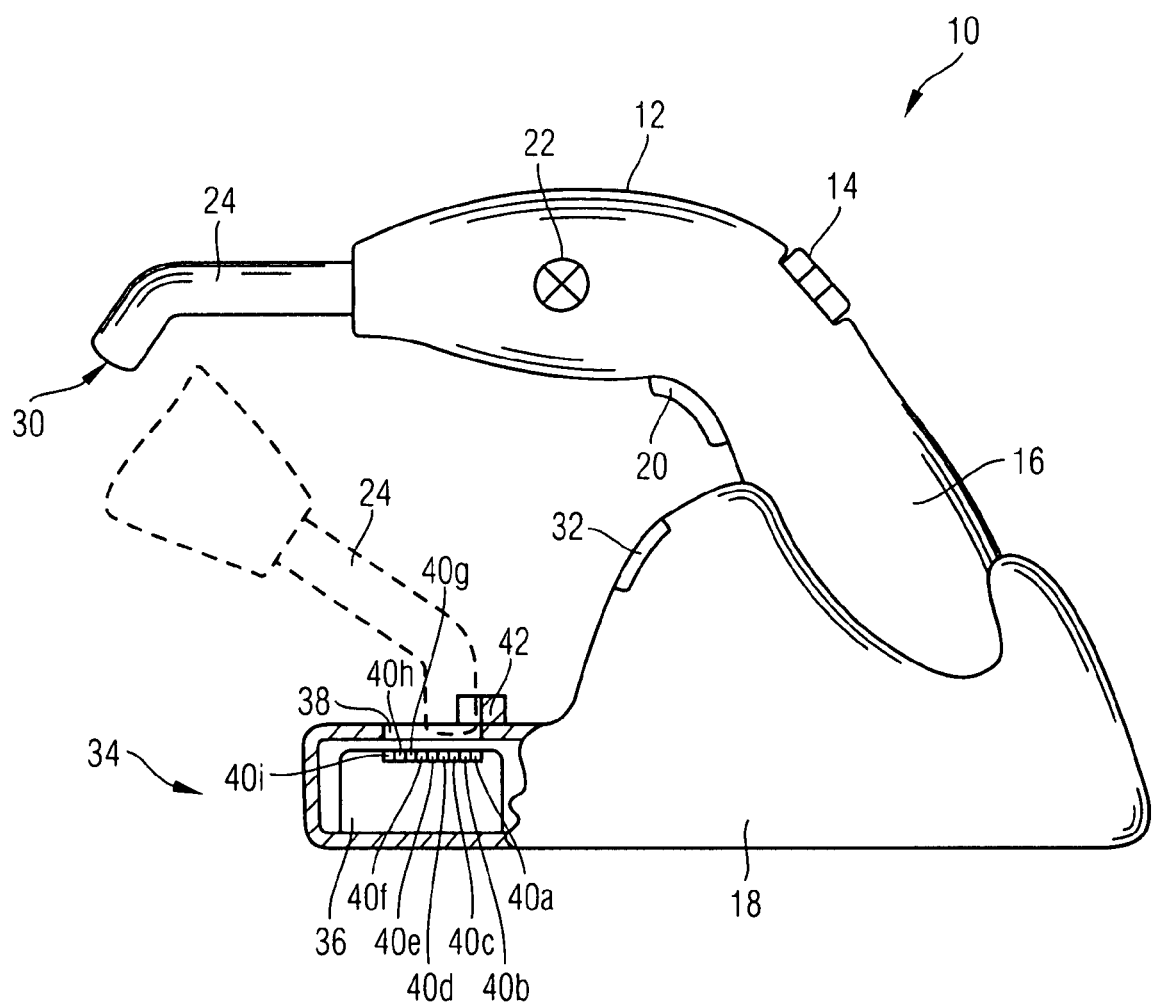
FIG. 1 shows a schematic view of a measurement apparatus according to the invention, combined with a light curing appliance.

The light curing appliance 10 illustrated in FIG. 1 has a housing 12 and an indication apparatus 14, which is located at the top on the rear face of a pistol grip 16 of the light curing appliance.

The light curing appliance 10 can be placed in a base station 18. The light curing appliance has rechargeable batteries which are automatically charged, when the state of charge requires this, when it is placed in the base station 18.

The light curing appliance can be switched on by means of a push-button. switch 20 which is arranged in a manner known per se on the inner upper face of the pistol grip 16. In this state, light is emitted from a schematically indicated light source 22, and part of it is passed via a reflector to a light guide apparatus 24.

The light guide apparatus 24 is composed of a tube in which an optical waveguide is guided. The front end of the light guide apparatus 24 is angled in order to provide easy access to points which are difficult to reach, and at which material to be polymerized must be subjected to light curing.

The light guide apparatus ends at the front at a light outlet area 30 which, for example, can also be provided with a transparent cover or possibly a convergent lens.

The light source 22 can be switched on by means of the push-button switch 20 and, during operations the light outlet area 30 is held in the mouth of the patient directly at the point at which the dental restoration material that is to be polymerized is located. The indication apparatus 14 signals when the polymerization process has been completed.

After completion of the curing process, the hand piece of the light curing appliance 10 is normally placed back in the base station 18, where rechargeable batteries which are accommodated in or on the pistol grip 16 of the light curing appliance are charged via electrical contacts.

A further indication apparatus 32 and/or the indication apparatus 14 also indicate/indicates the state of charge of the rechargeable batteries, and light curing is allowed only when the remaining energy in the rechargeable batteries is likewise sufficient for the curing process.

The invention provides for the design of a light measurement apparatus, to be precise preferably one which is integrated directly in the base station 18. The light measurement apparatus 34 is used to check whether the optical characteristics of the light curing appliance 10 are also sufficient—that is to say irrespective of the state of charge of the rechargeable batteries. By way of example, a reduction in the light output from the light source, dirt on the reflectors which are installed there, an accidentally inclined position of the light guide apparatus, or dirt on or other damage to the light outlet area 30 can result in a reduction of the light power, even if the check of the electrical values in the light curing appliance leads to the expectation that there is no malfunction.

However, according to the invention, this can be checked by means of the light measurement apparatus 34. The light measurement apparatus 34 has a light sensor arrangement 36 which extends underneath a horizontal surface of the base station 18. The housing of the base station 18 has a transparent cover 38 so that the light sensors are protected against dirt.

Figure 2:
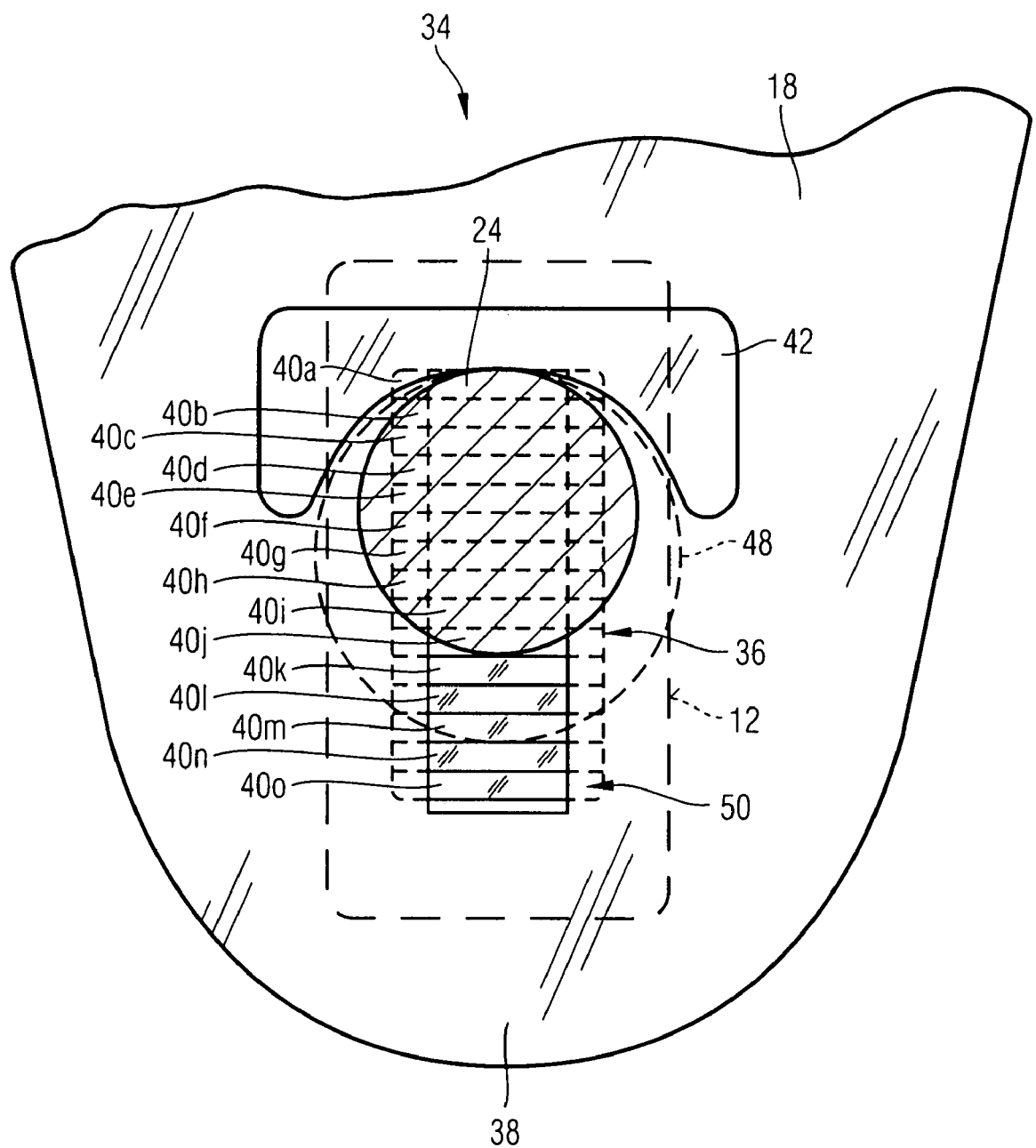
FIG. 2 shows a schematic view of a measurement apparatus according to the invention, illustrated enlarged.

The light sensor arrangement has a large number of light sensors, with the light sensors 40a, 40b, 40c, 40d, 40e, 40f, 40g, 40h, and 40i being illustrated in FIG. 1, and with light sensors 40a, 40b, 40c, 40d, 40e, 40f, 40g, 40h, 40i, 40j, 40k, 40l, 40m, 40n and 40o being illustrated in FIG. 2. The light sensors 40 are arranged in a row, one behind the other.

Furthermore, the light measurement apparatus 34 has a stop 42 which acts as a stop for the light guide apparatus 24, the stop being disposed immediately adjacent to an end of the light sensor arrangement 36. The light guide apparatus 24 is additionally illustrated in FIG. 1 in the form of dashed lines. In order to check the optical characteristics, the handset is held with the light guide apparatus 24 pointing downwards against the stop 42, and is operated. This results in light being applied to the sensors 40a, 40b, 40c, 40d and 40e, while the sensors 40f to 40o remain unilluminated.

The output signal for all of the light sensors is detected, and is supplied to an evaluation circuit, which is not illustrated. The evaluation circuit detects both the intensity of the respectively emitted radiation and any light sensor—in this case after the light sensor 40e—from which there is no illumination. Both the diameter of the light outlet area 30 and the strength of the indicated light radiation are determined from these two detected measured values—in each case in a distribution transversely across the light outlet area 30—and are indicated on the indication apparatus 32.

FIG. 2 shows a corresponding light measurement apparatus 34, illustrated enlarged. The stop 42 has concave curvature towards the light guide apparatus 24, and to this extent can hold the light guide apparatus 24, or else, for example, a larger light guide apparatus 48, which is illustrated by dashed lines in FIG. 2.

As can be seen from FIG. 2, the cover 38 has a width which allows the smallest measured light guide apparatus 24 to be detected. It is self-evident that, instead of this, the width can also be considerably reduced, for example to one fifth of the width of the cover 38 illustrated in FIG. 2, The cover 38 may be covered by a translucent or transparent filter which essentially compensates for the spectral sensitivity of the sensors in the light sensor arrangement. In addition, a protective shutter may be installed on either the filter or the cover, which leaves free an area in the form of a slot above the light sensor arrangement, and covers areas to the side of this area. The thickness of the cover—and likewise of the filter which is formed on it—is quite small, for example around one millimeter. Tests have shown that the beam widening of the light guide apparatuses is uniform in this region, so that the actual diameter of the light outlet area can be determined directly, based on the distance between the light outlet area and the sensors being constant.

The light sensors 40a, 40b, 40c, 40d, . . . 40o extend closely adjacent to one another and in practice form a type of bar. While 15 light sensors are shown in FIG. 2, the sensors may be in the form of a strip, and may include between three to five hundred light sensors. Their width is considerably greater than their height, with their effective width being reduced by the slot 38. They are each separated from one another by narrow, opaque webs (not shown), so that no light can be passed over from adjacent light sensors. The webs extend above the light sensors towards the cover 38, but do not contact the cover.

A discriminator may be connected to one light sensor (40a, 40b, 40c, . . . ), which discriminator emits an ON signal when the detected amount of light is above a predetermined threshold value, and emits an OFF signal when the amount of light is below the threshold value.

A further feature of the invention is that the number of sensors illuminated by the light guide apparatus are determined by an evaluation circuit, and the average amount of light applied to the sensors is calculated in order to calculate the light power per unit area of a light source. The light sensor arrangement measures not only the amount of light emitted per unit area from the light outlet area but also the diameter of the light outlet area.

It is self-evident that, instead of this, the light measurement apparatus 34 according to the invention may also be installed at any other desired point. For example, one central light measurement apparatus can also be provided for a large number of light curing appliances 10, and it is also possible to code the respective hand piece, so that the light measurement apparatus detects which hand piece is currently being measured. In this refinement, the measured values are preferably detected and stored, and any deterioration in the optical characteristics is used to determine when it can thus be expected that the light curing appliance requires a general overhaul.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A light measurement apparatus, for a light source on a hand-held dental light curing unit to which a light guide apparatus is connected, with the light guide apparatus having a light outlet area, and the light measurement apparatus being on a base unit having a light sensor arrangement (36) having at least two sensors (40a, 40b, 40c, . . .), to which light from the light outlet area (30) can be applied wherein the light sensor arrangement (36) measures not only the amount of light emitted per unit area from the light outlet area (30) but also the diameter of the light outlet area (30), whereby it can be determined if the optical characteristics of the light curing unit is or is not sufficient to properly cure a dental restoration.

2. The light measurement apparatus as claimed in claim 1, wherein a prefabricated light sensor arrangement (36), with a transparent cover (38), is installed in the base unit.

3. The light measurement apparatus as claimed in claim 1, wherein the base unit has a stop (42) for the light guide apparatus (24) to make contact with.

4. The light measurement apparatus as claimed in claim 1, wherein the light sensor arrangement (36) has light sensors (40a, 40b, 40c, . . .)which are arranged in a row, and wherein the longitudinal extent of the row is greater than the light outlet area.

5. The light measurement apparatus as claimed in claim 3, wherein the light outlet area (30) covers at least one light sensor when the light guide apparatus (24) is making free contact with the stop (42).

6. The light measurement apparatus as claimed in claim 1, wherein the light outlet area (30) is essentially circular, and the light sensors (40a, 40b, 40c, . . . ) each have a width which is less than the width of the light outlet area (30) that occurs, are arranged immediately adjacent to one another.

7. The light measurement apparatus as claimed in claim 1, wherein the light sensor arrangement (36) is an arrangement of light sensors (40a, 40b, 40c, 40d, . . . ) in the form of a strip of between three and five hundred light sensors.

8. The light measurement apparatus as claimed in claim 1, wherein each light sensor (40a, 40b, 40c, . . . ) has an aspect ratio (width/length ratio) of at least 2:1 and at most 20:1.

9. The light measurement apparatus as claimed in claim 1, wherein the light outlet area (30) is essentially circular, and wherein the light sensor arrangement (36) has a length of more than 10-times the diameter of the light outlet area.

10. The light measurement apparatus as claimed in claim 2, wherein the cover (38) is covered by a translucent or transparent filter which essentially compensates for the spectral sensitivity of the sensors in the light sensor arrangement (36).

11. The light measurement apparatus as claimed in claim 10 wherein a protective shutter is fitted to the filter or to the cover (38), which leaves free an area in the form of a slot above the light sensor arrangement (36) and covers areas to the side of this area.

12. The light measurement apparatus as claimed in claim 1, wherein the light outlet area (30) can be used for different light guide apparatuses (24).

13. The light measurement apparatus as claimed in claim 1, wherein a discriminator is connected to one light sensor (40a, 40b, 40c, . . . ) and emits an ON signal when the detected amount of light is above a predetermined threshold value, and emits an OFF signal when the amount of light is below the threshold value.

14. The light measurement apparatus as claimed in claim 1, wherein an evaluation circuit is connected to the light sensor arrangement (36) and forms the ratio of the amount of light detected by the light sensors (40a, 40b, 40c, . . . ) to the number of light sensors (40a, 40b, 40c, . . . ) which receive light and are adjacent to one another.

15. The light measurement apparatus as claimed in claim 14, wherein the light power which is emitted from the light outlet area (30) is calculated by the evaluation circuit on the basis of the ratio of the amount of light measured by the light sensors (40a, 40b, 40c, . . . ) over their area and the total light outlet area (30).

16. The light measurement apparatus as claimed in claim 3, wherein the light sensor arrangement (36) is in the form of a single-line or multiple-line bar, at one of whose ends the stop for the light guide apparatus (24) is arranged.

17. The light measurement apparatus as claimed in claim 1, wherein the number of sensors illuminated by the light guide apparatus (24) is determined by an evaluation circuit, and the average amount of light applied to the sensors is calculated in order to calculate the light power per unit area of a light source.

* * * * *